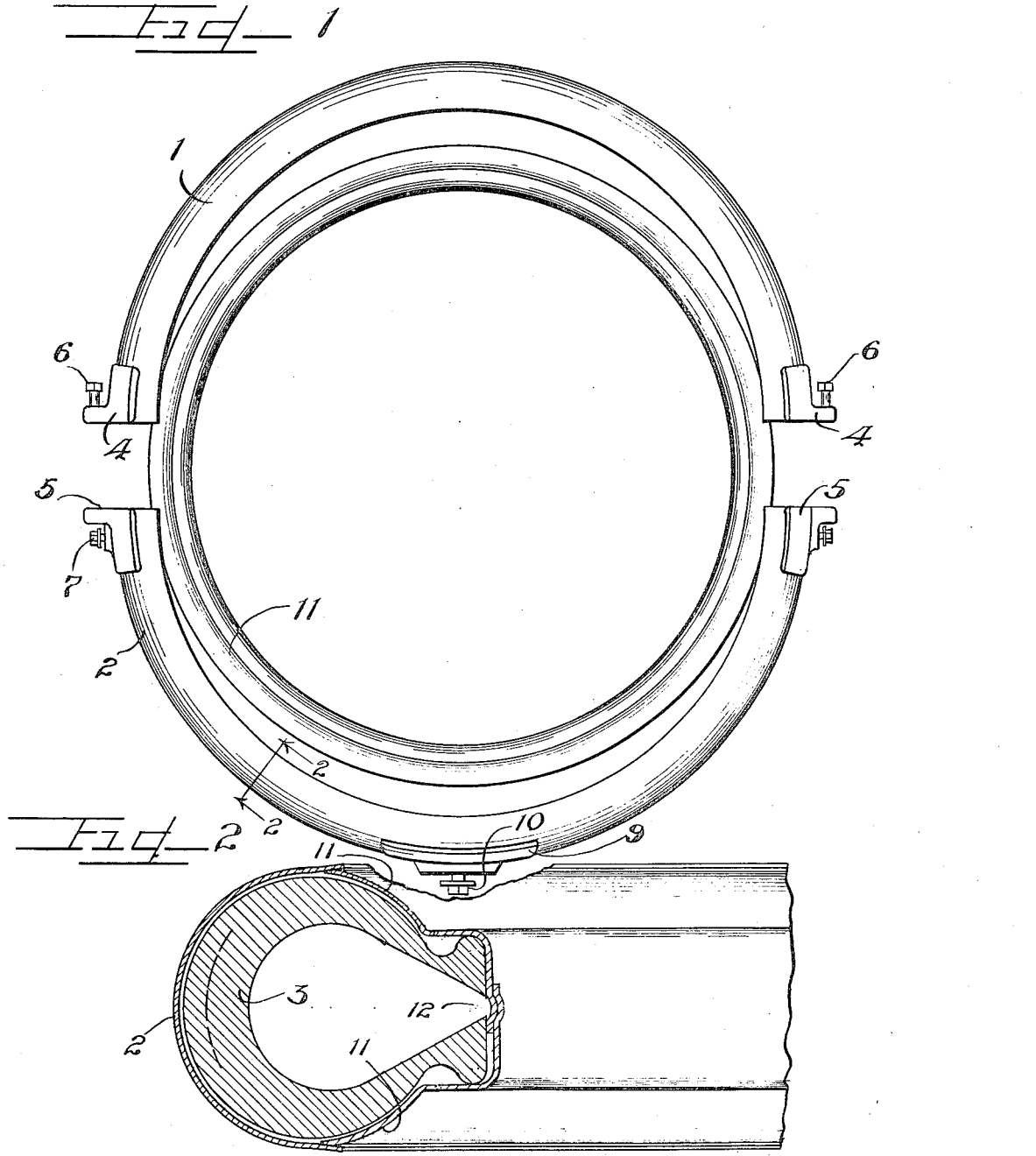

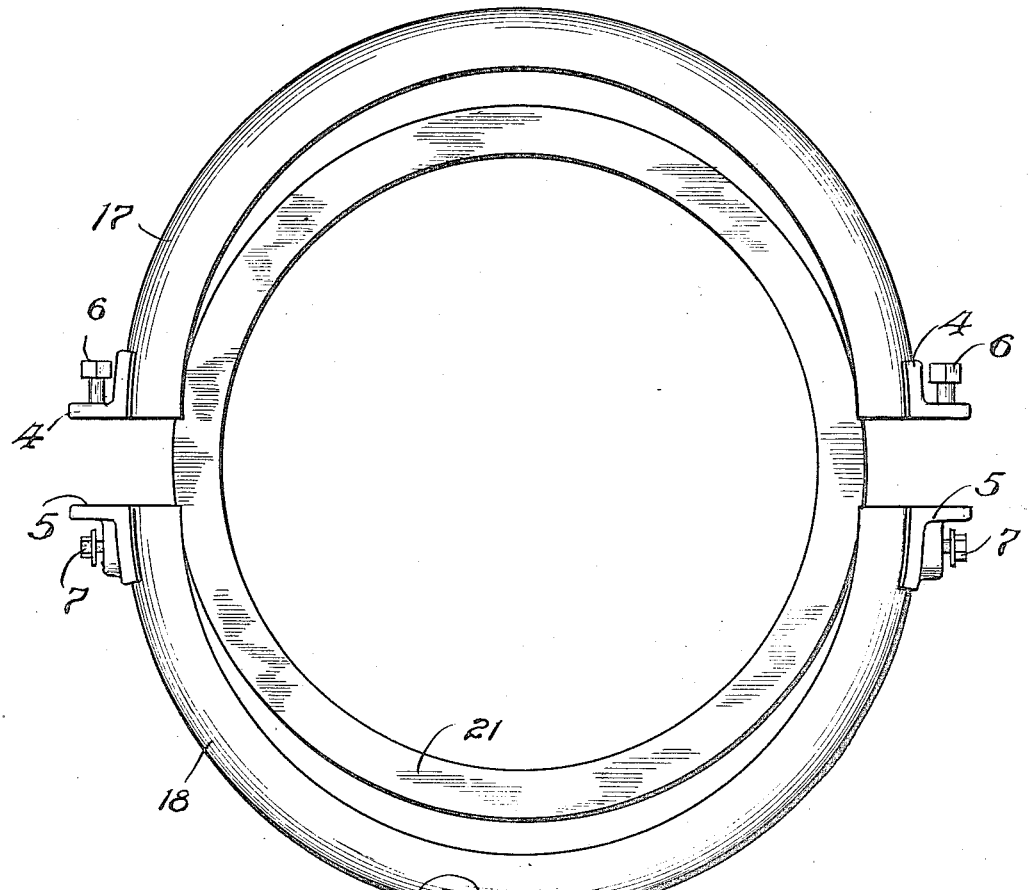

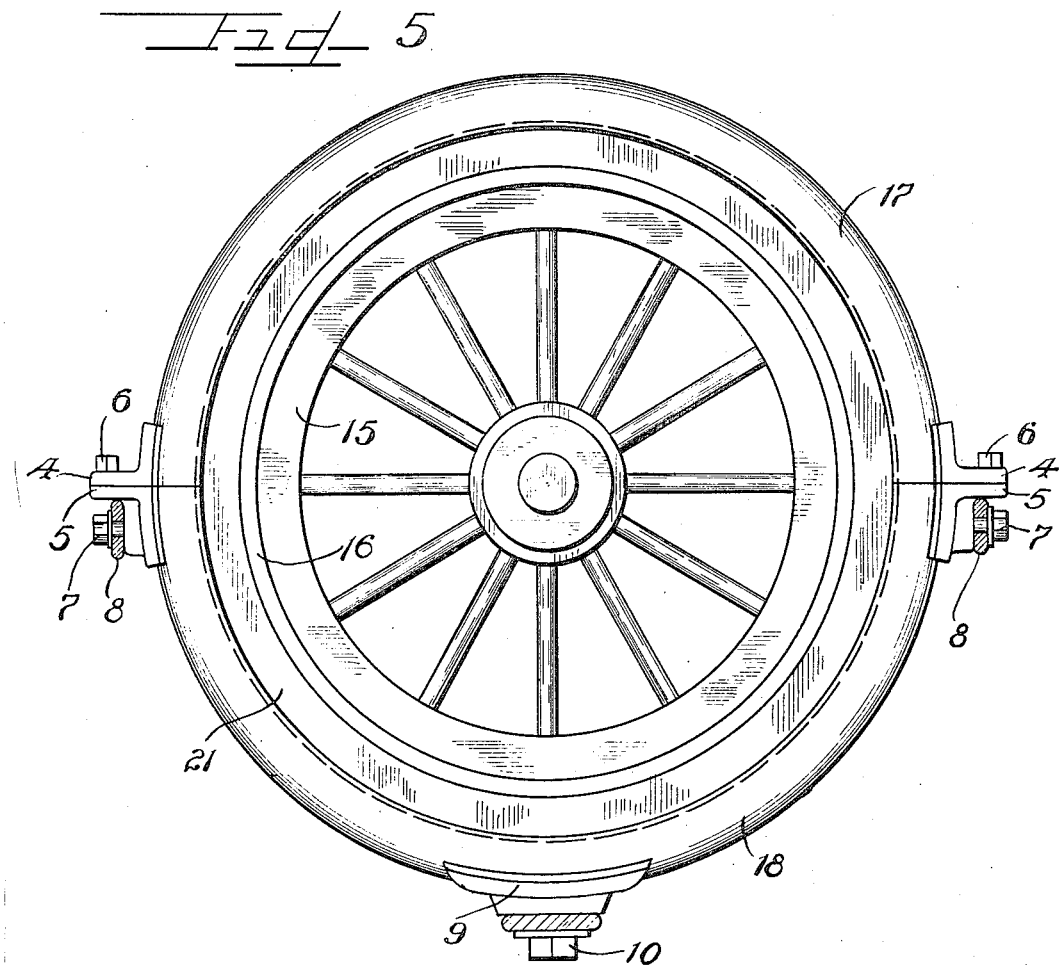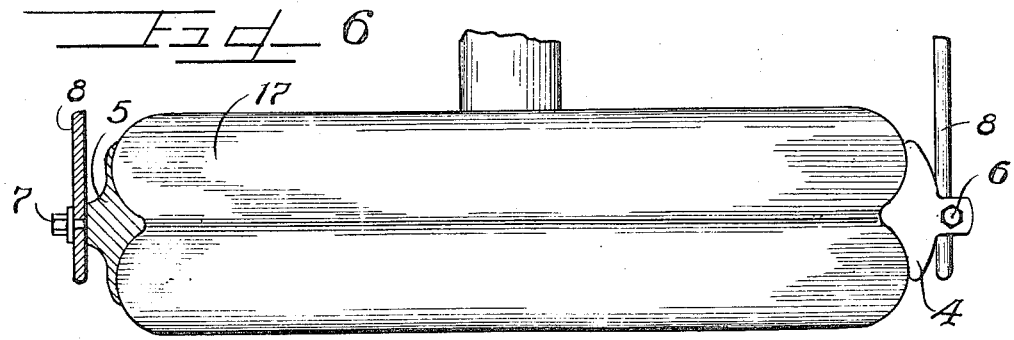

UNITED STATES PATENT OFFICE.

WALTER R. GREEN, OF CHICAGO, ILLINOIS.

TIRE-HOLDER.

1,127,432. Specification of Letters Patent. Patented Feb. 9, 1915.

Application filed December 15, 1913. Serial No. 806,669.

*To all whom it may concern:*

Be it known that I, WALTER R. GREEN, a citizen of the United States, and a resident of the city of Chicago, in the county of Cook and State of Illinois, have invented certain new and useful Improvements in Tire-Holders; and I do hereby declare that the following is a full, clear, and exact description of the same, reference being had to the accompanying drawings, and to the numerals of reference marked thereon, which form a part of this specification.

Many different types of tire holders have been devised, but generally those constructed of metal have been unduly heavy. Furthermore, metal tire holders have been constructed to efficiently cover and protect the tire, but such tire holders usually embraced a number of complicated parts, and required considerable time and delay to insert or remove a tire therefrom.

This invention relates to a relatively light tire holder consisting of few parts adapted to efficiently incase a tire so that the same is entirely inclosed, either when said tire is free of a rim, or is mounted upon a rim, or upon a wheel, the latter case being common nowadays since wire wheels have come into vogue.

It is an object of this invention to construct a tire holder adapted to carry a plurality of tires, any one of which may be removed therefrom by removal of an upper half of the tire holder.

It is also an object of this invention to construct a tire holder which may accommodate either a tire mounted on a rim or on a wheel, or a tire entirely detached from either thereof, the tire holder in any case serving to effectually incase the tire to protect the same from the weather.

It is also an object of this invention to construct a tire holder wherein interfitting rings are provided which may be sprung over the beads of the tire, different shaped rings being provided, dependent upon whether or not the tire is unattached or mounted upon a rim or wheel, said rings coöperating with the tire casing to effectually inclose the tire and protect the same.

It is furthermore an object of this invention to construct a tire holder adapted to carry a plurality of tires, comprising a two part casing, and rings which may be sprung over the beads of a tire to coöperate with said casing to effectually inclose the tire therewithin.

It is finally an object of this invention to construct a tire holder light in weight, durable in construction, simple in operation and acting effectually to inclose and protect the tire from the weather.

The invention (in a preferred form) is illustrated in the drawings and hereinafter more fully described.

In the drawings: Figure 1 is a front elevation of a tire holder with the removable portion partly detached, and also showing the tire rings. Fig. 2 is a section partly broken away on line 2—2 of Fig. 1, with the tire shown seated in the casing. Fig. 3 is a view similar to Fig. 1, of a modified form of my device. Fig. 4 is a section similar to Fig. 2, taken through the modified form shown in Fig. 3. Fig. 5 is a modified form of my device showing a tire holder carrying a wheel with a tire thereon. Fig. 6 is a top plan view of the device shown in Fig. 5, with one of the attaching lugs shown in section. Fig. 7 is a detail view of a modified form of a part of my invention.

As shown in the drawings: The device, as shown in Figs. 1 and 2, is adapted to carry only one tire, and consists of upper and lower detachable casing members 1, and 2, respectively, which are substantially semicircular in cross section and are open along their inner periphery to permit insertion of a tire 3, therein. Lugs 4, and 5, respectively, are secured upon said upper and lower casing sections to permit the same to be engaged together by means of bolts 6, for the purpose. Bolts 7, are also threaded into the lugs 5, on the lower section, to receive attaching bars 8, as shown in Figs. 5 and 6, whereby the device may be held in proper position on an automobile. Another attaching lug 9, is secured upon the bottom of the lower casing member 2, and is provided with a bolt 10, whereby said lower casing member may be rigidly bolted to the running board of, or to a brace on the automobile. A pair of rings 11, shaped to fit around one side of the inner portion of the tire and over the beads thereof, are provided, said rings having overlapping portions which are struck inwardly at the points indicated by the reference numeral 12, to permit a resilient locking engagement therebetween.

In case the tire 3, should be mounted upon a demountable rim, a slight variation in the construction of the rings is made, as shown in Fig. 7. The demountable rim is indicated by the reference numeral 13, and the interfitting resilient tire rings which coöperate with the casing to completely cover the tire, are denoted by the reference numerals 14, the construction of said rings being substantially the same as that of the rings 11, already described, except that the depth of the rings 14, is greater in order to permit the same to also incase the rim 13.

In cases where a tire is mounted upon a wheel, denoted as a whole by the reference numeral 15, and provided with a rim 16, the tire rings are of slightly different construction. As shown in Figs. 3 to 6 inclusive, the casing sections, denoted respectively as 17 and 18, are adapted to receive two tires therein, and when the tires are inserted an intermediate ring 19, is provided therebetween. Of course the same type of attaching and locking lugs is provided as in Fig. 1, although the form may be modified to a slight extent, owing to the fact that the casing sections are adapted to carry two tires. In this latter construction no attempt is made to inclose the rim, which fits over the beads of the tires 20, but instead the rings 21, are substantially flat and have an inturned flange 22, adapted to bear inwardly against the rim 16, of the wheel.

The operation is as follows: When a tire is to be carried in the tire holder the top casing section 1, or 17, as the case may be, is removed by unscrewing the attaching bolts 6, with the rings 11, 14, or 21, (each of the latter reference numerals of course indicating a different type of ring) sprung around the inner portion of the tire and its beads, or a rim, if a rim is attached thereto, and the tire thus fitted is inserted in the lower casing section. The top section is then fitted thereover and in each case the casing section overlaps the edge of the tire ring, and as the top section is screwed down tightly by means of the bolts 6, the tire rings are sprung into close relation with the casing sections, as well as into tight engagement with the tire beads or rims, or with one another, as the case may be, thus insuring a non-rattling and weatherproof inclosure for the tire.

In the modification illustrated in Figs. 3 to 6 inclusive, the intermediate tire ring, when the device is assembled and set up, springs against the respective rims 16, of the adjacent wheels 15, thus sealing the opening therebetween. Owing to the interfitting elements 12, on the tire rings shown in Figs. 1 and 2, said rings are easily snapped together, and of course when the top casing section is removed it is a simple matter to lift the tire from the lower casing section and remove the tire rings.

I am aware that various details of construction may be varied through a wide range without departing from the principles of this invention. I therefore do not purpose limiting the patent granted otherwise than necessitated by the prior art.

I claim as my invention:

1. A tire holder of the class described comprising upper and lower casing sections, flanged interfitting tire rings adapted to be fitted around the inner periphery of a tire and with the tire inserted in the casing sections to interfit with the casing to entirely incase the tire therein, and a plurality of locking lugs secured to the outer periphery of said upper and lower casing sections disposed at right angles thereto adapting said sections to be locked together.

2. A tire holder of the class described comprising detachable tire casing sections, and interfitting tire rings adapted to extend around a portion of the inner periphery of the tire, means integral therewith to lock said rings together, said rings when inserted in the casing sections on the tire adapted to coöperate with said sections to inclose the tire.

3. In a device of the class described casing sections, and rings adapted to be connected to one another and fitted to a tire on each side thereof prior to the insertion of a tire within the casing sections, said rings, when the tire is inserted within the casing, projecting inwardly between the tire and said casing, along one edge of said rings and held tightly in position to inclose the tire within said casing when the casing sections are locked together.

4. A tire holder of the class described comprising detachable tire casing sections, and interfitting tire rings adapted to extend for a portion of the inner periphery of the tire, and to overlap and resiliently engage one another, said rings when inserted in the casing section adapted to coöperate therewith to inclose the tire.

5. In a device of the class described detachable casing sections, and rings adapted to be fitted to a tire on each side thereof prior to the insertion of a tire within the sections, said rings, when the tire is inserted within the casing, projecting between the tire and said casing, along one edge of said rings and held tightly in position to inclose the tire within said casing when the casing sections are locked together.

In testimony whereof I have hereunto subscribed my name in the presence of two subscribing witnesses.

WALTER R. GREEN.

Witnesses:
CHARLES W. HILLS, Jr.,
FRANK K. HUDSON.